Sept. 28, 1965    R. HOLT    3,208,321
BREAD SLICING MACHINE
Filed Nov. 14, 1962    10 Sheets-Sheet 1
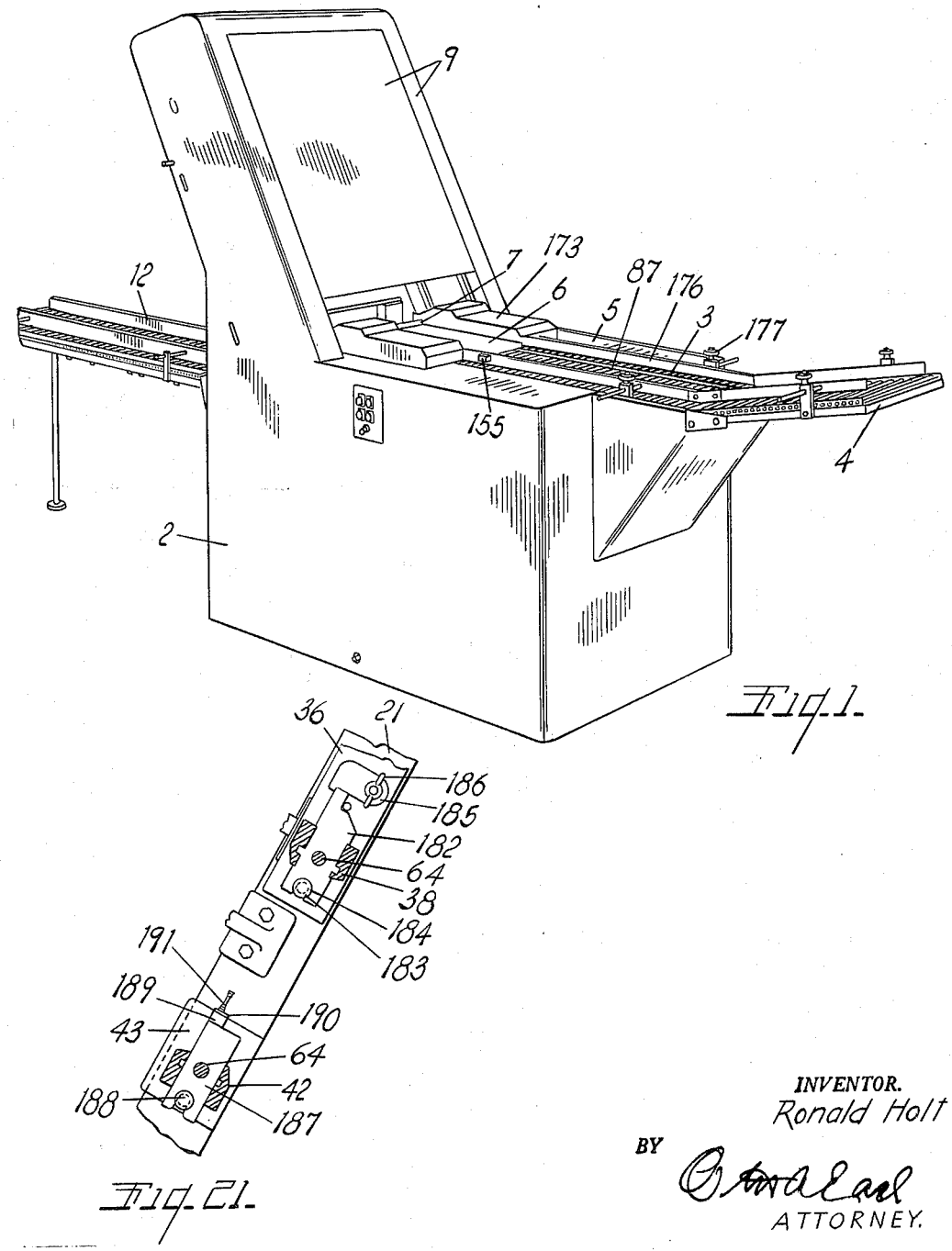
INVENTOR.
Ronald Holt
BY
Oswald Earl
ATTORNEY.

Sept. 28, 1965    R. HOLT    3,208,321
BREAD SLICING MACHINE
Filed Nov. 14, 1962    10 Sheets-Sheet 2
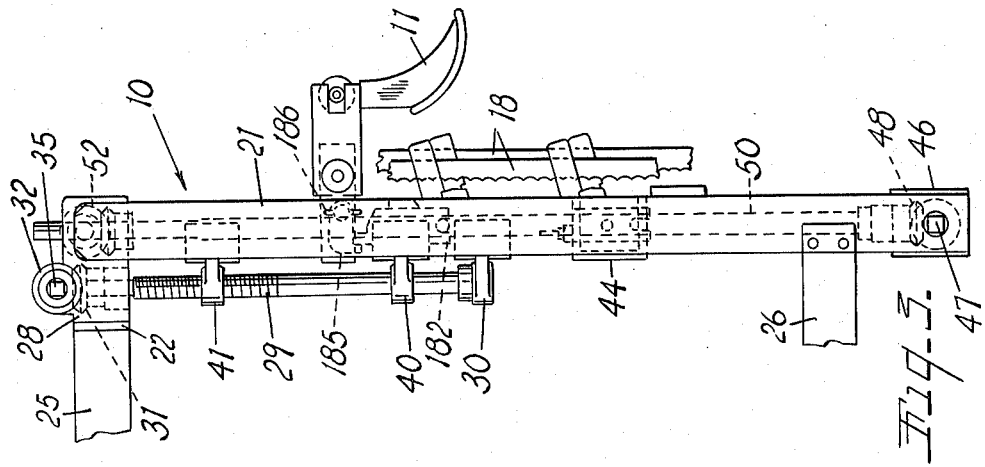
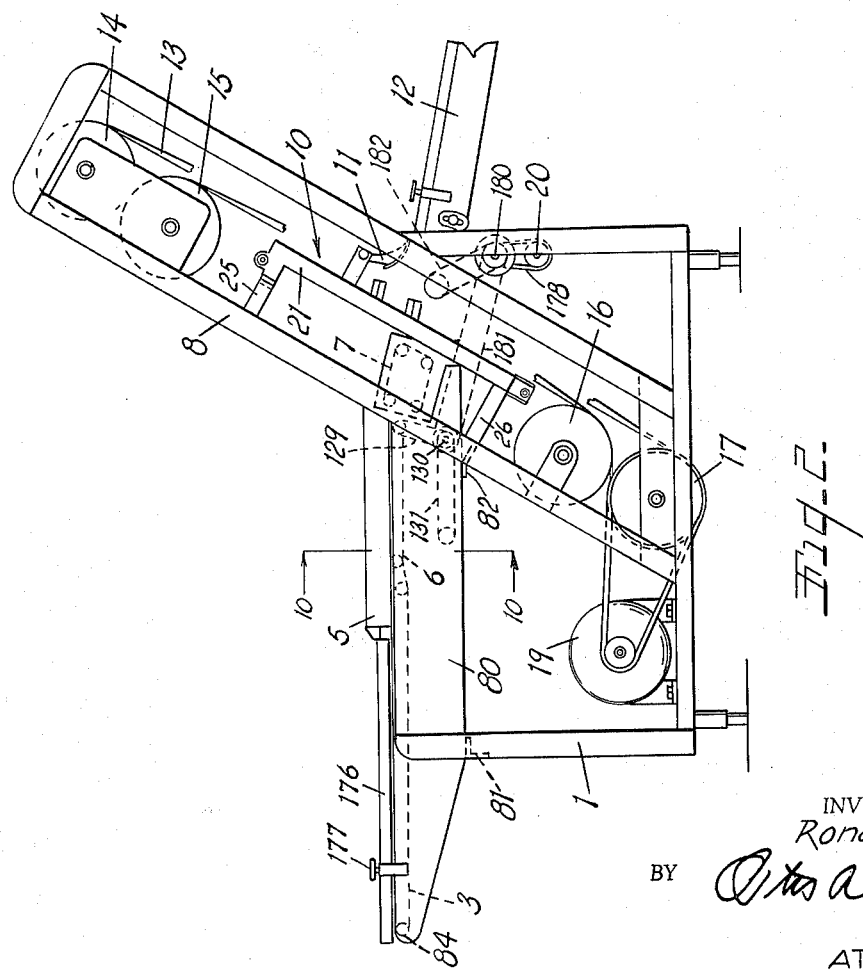
INVENTOR.
Ronald Holt
BY
ATTORNEY Sept. 28, 1965 R. HOLT 3,208,321
BREAD SLICING MACHINE
Filed Nov. 14, 1962 10 Sheets-Sheet 3
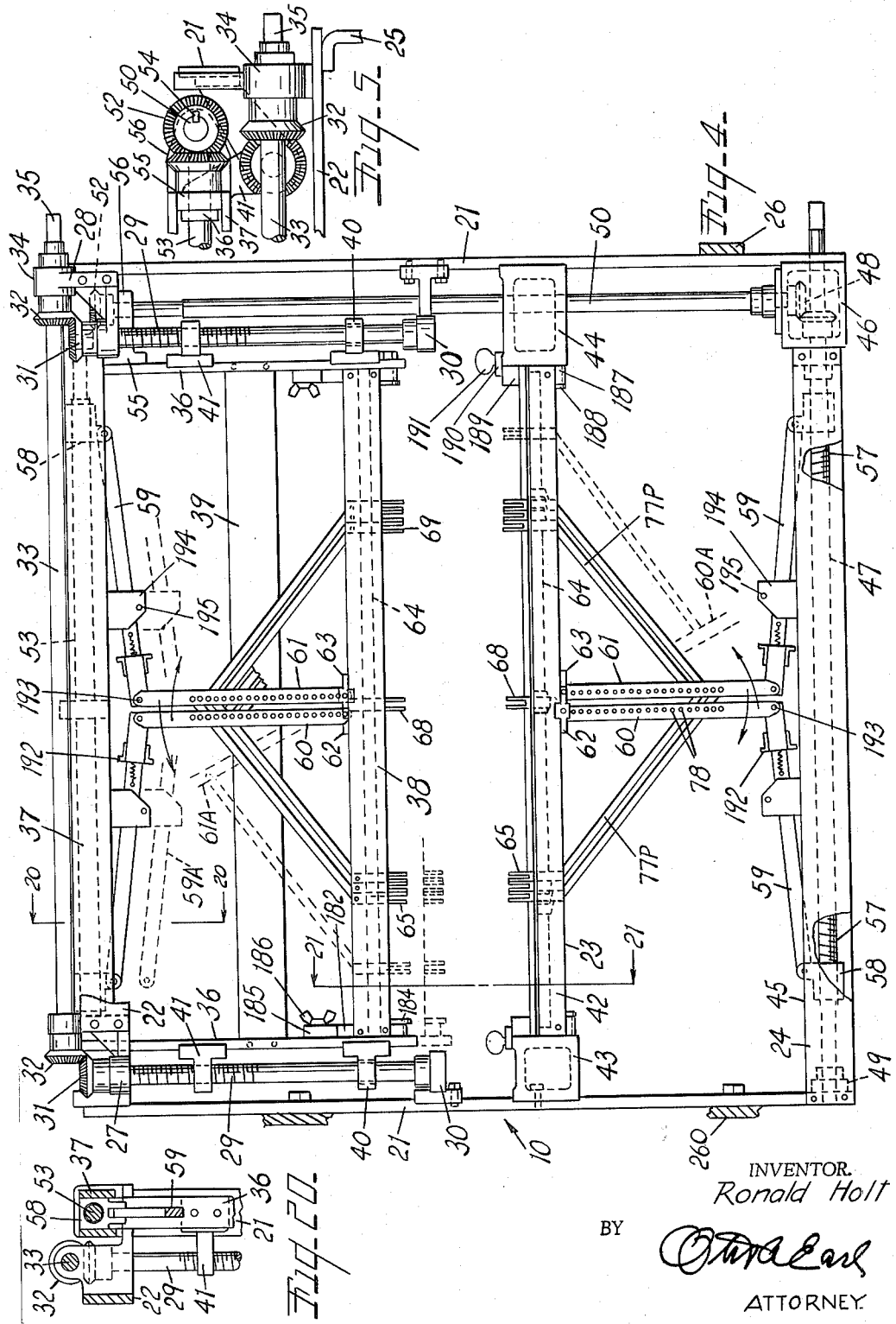
INVENTOR.
Ronald Holt
BY
ATTORNEY Sept. 28, 1965 R. HOLT 3,208,321
BREAD SLICING MACHINE
Filed Nov. 14, 1962 10 Sheets-Sheet 4
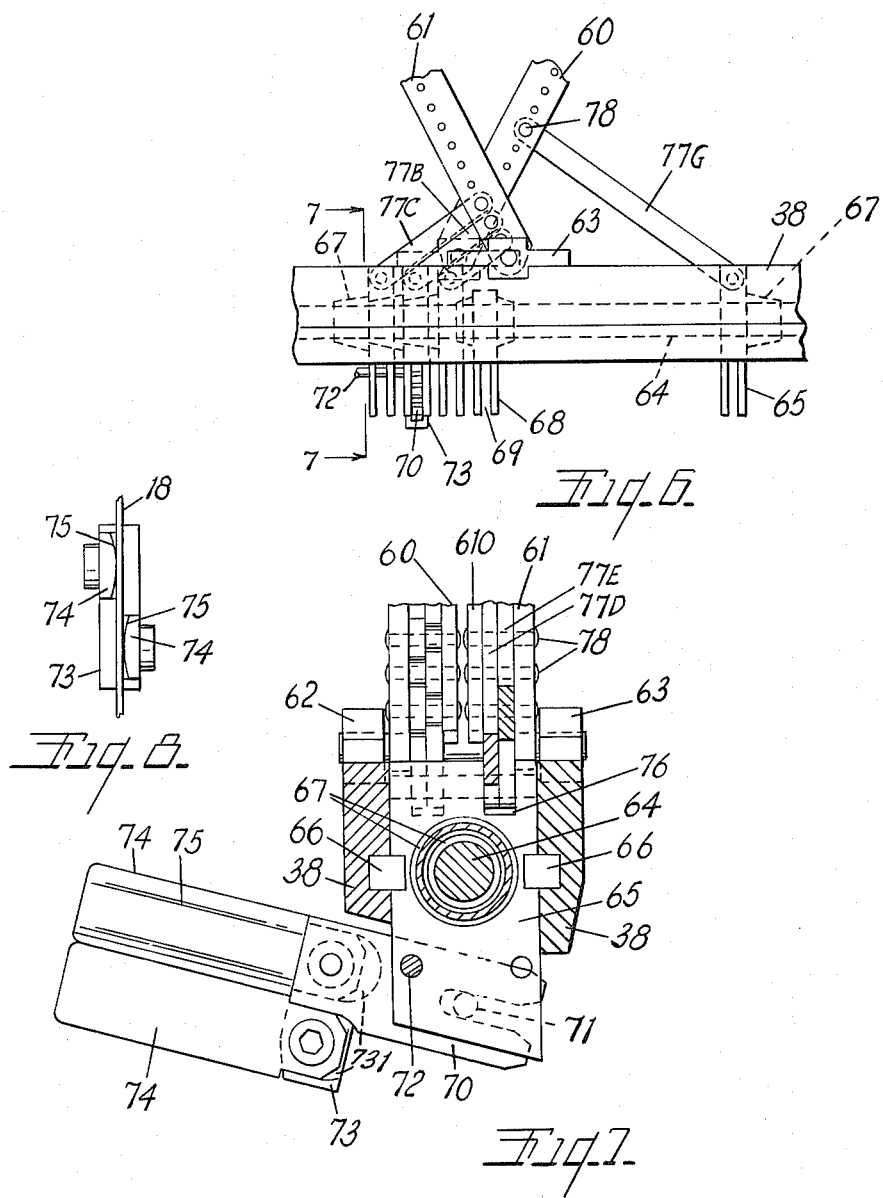
INVENTOR.
Ronald Holt
BY
Otto O. Earl
ATTORNEY.

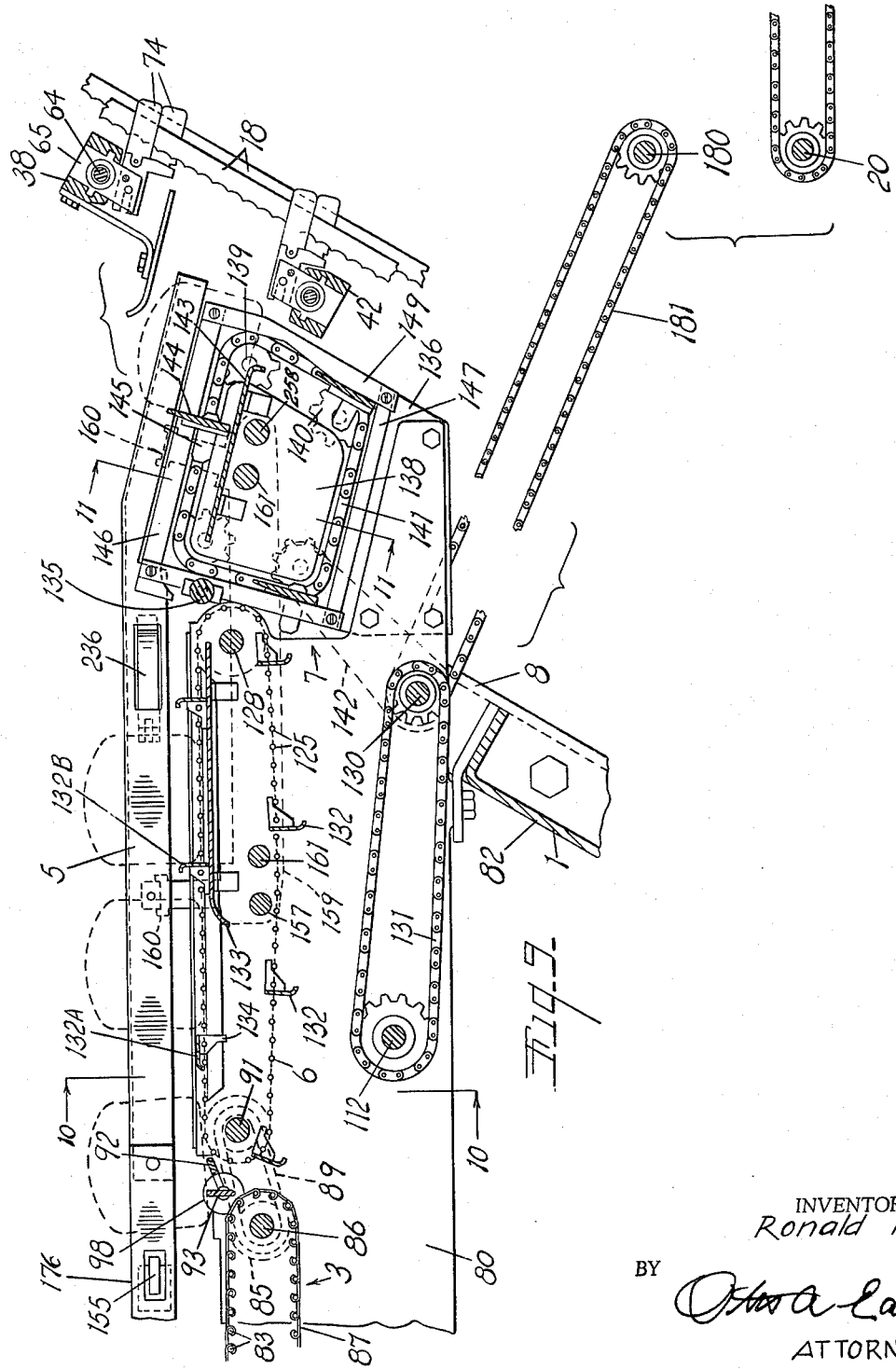

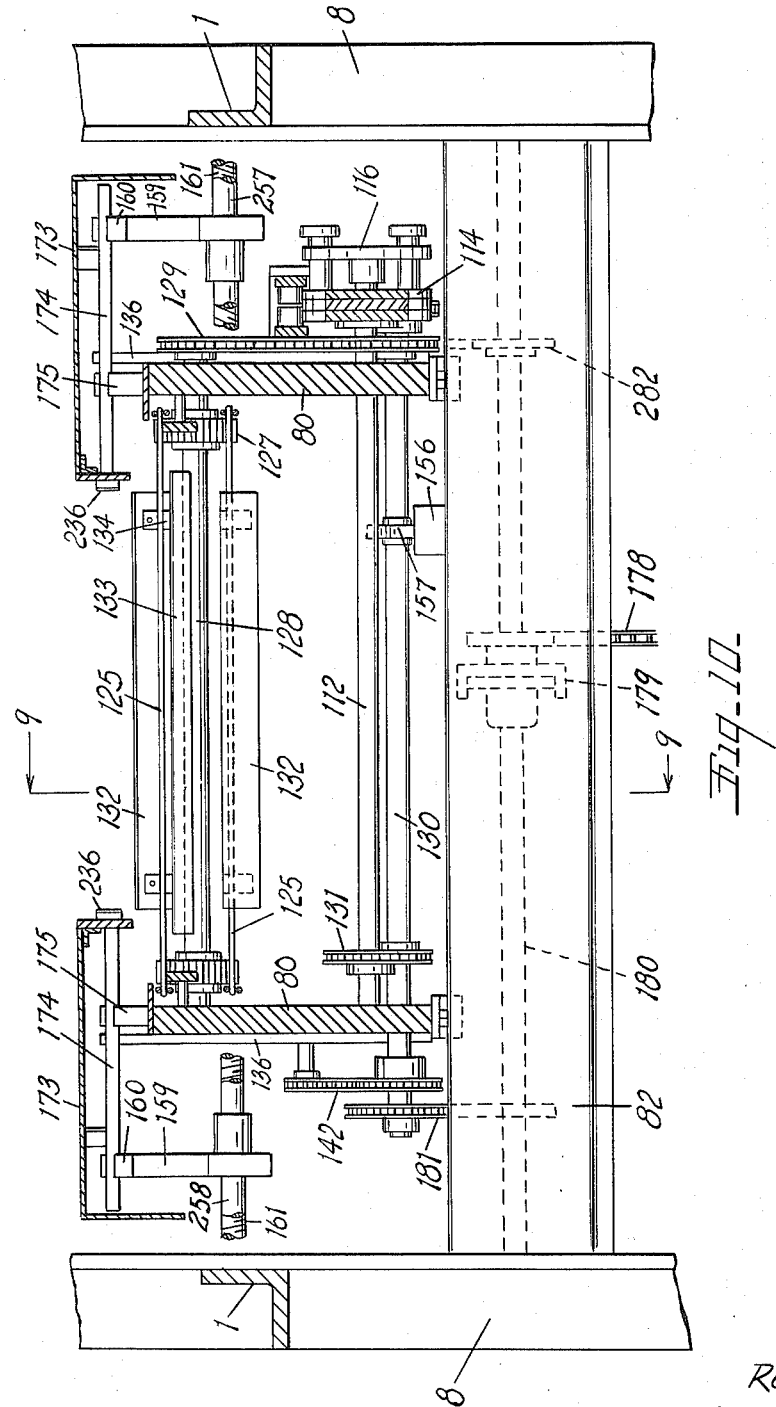

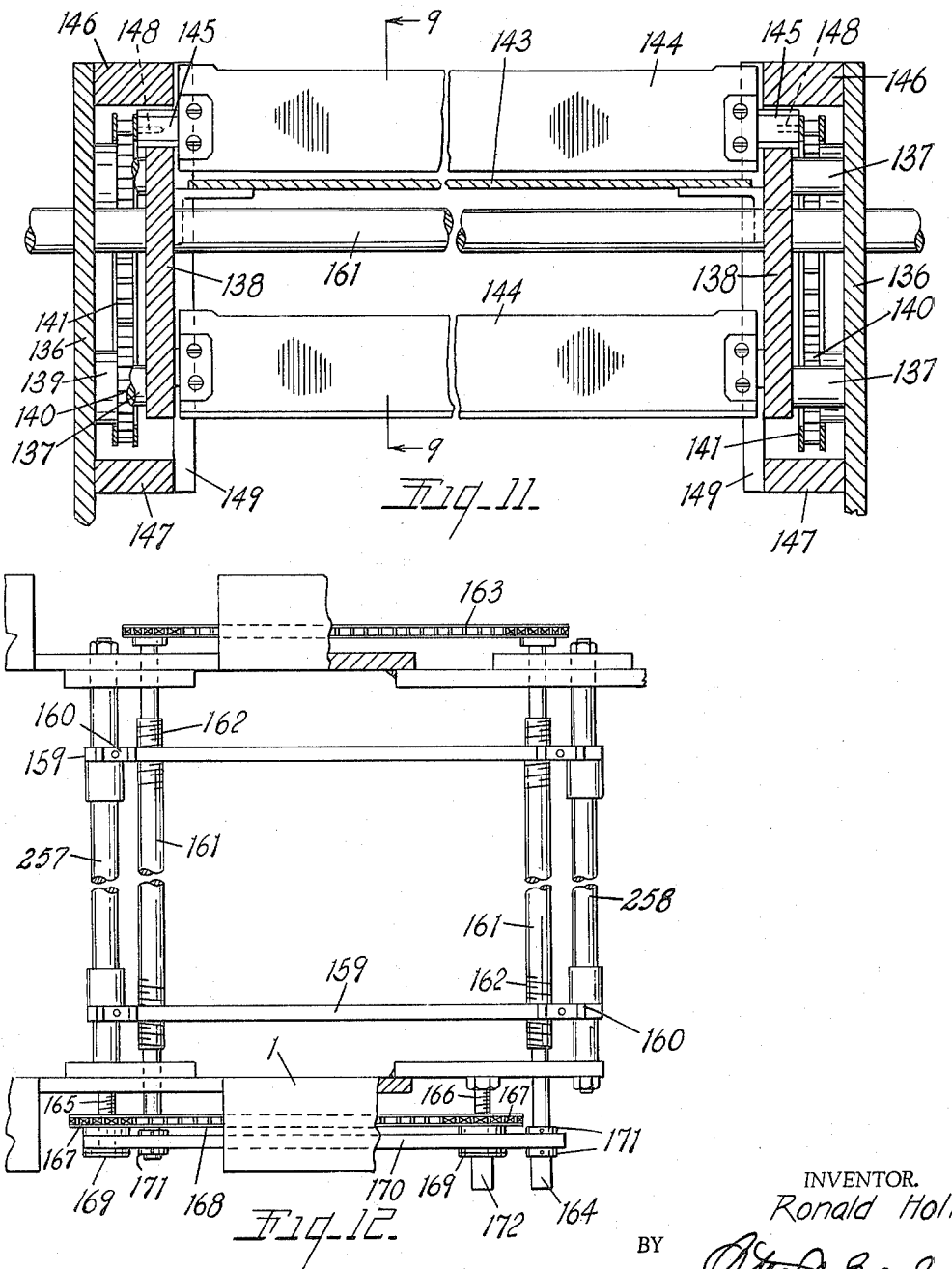

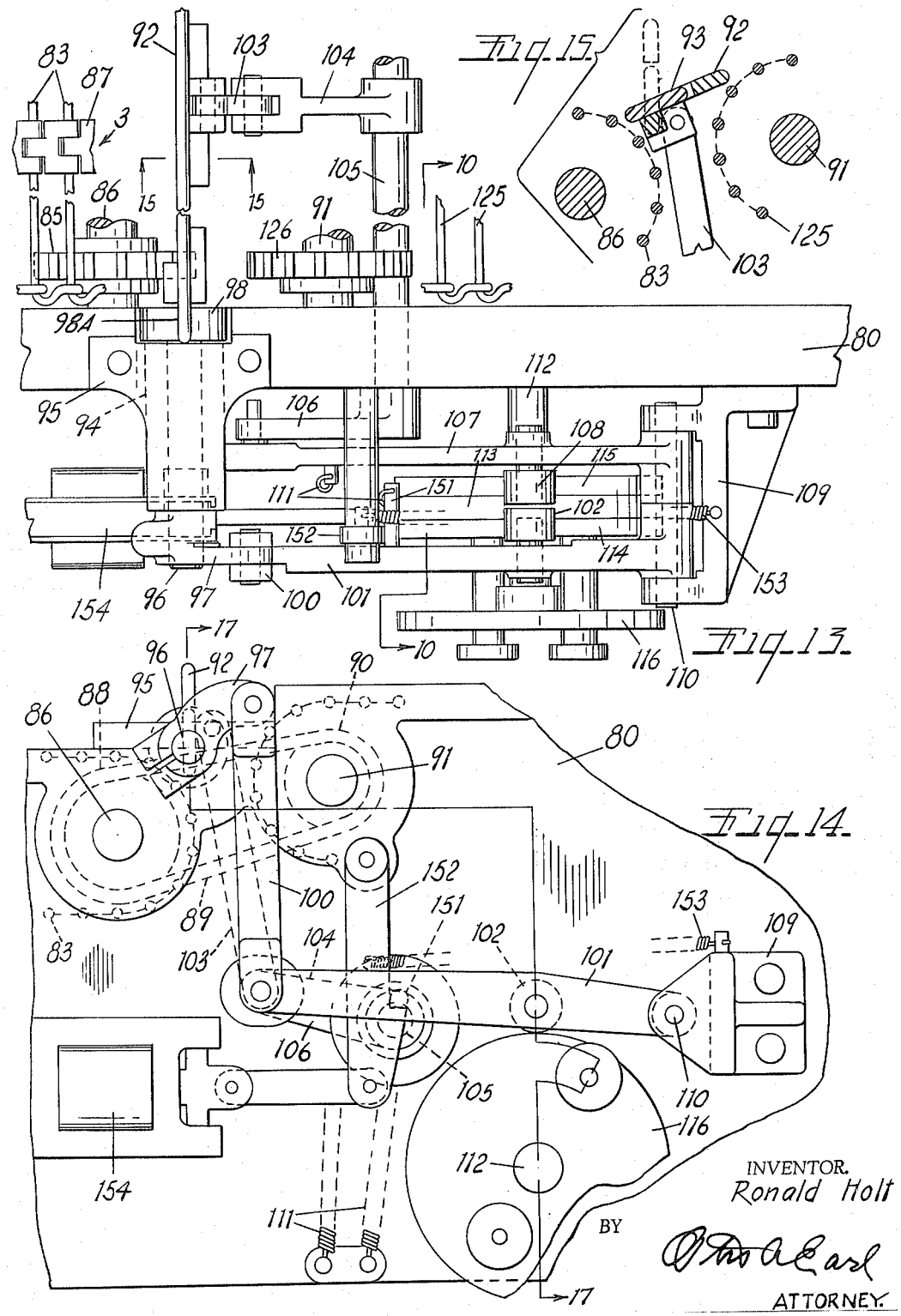

Sept. 28, 1965    R. HOLT    3,208,321
BREAD SLICING MACHINE
Filed Nov. 14, 1962    10 Sheets-Sheet 9
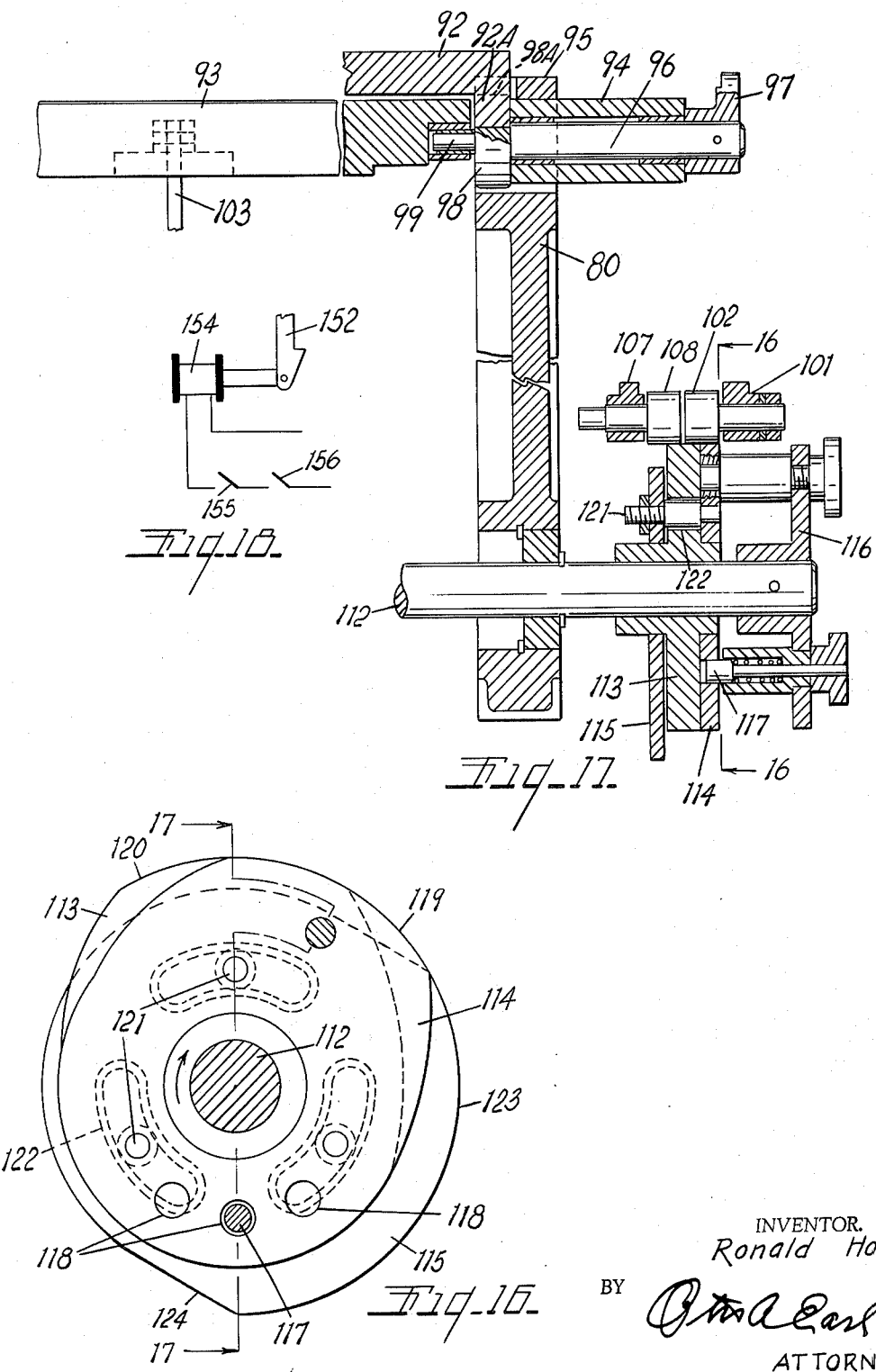
INVENTOR.
Ronald Holt
BY
ATTORNEY Sept. 28, 1965   R. HOLT   3,208,321
BREAD SLICING MACHINE
Filed Nov. 14, 1962   10 Sheets-Sheet 10
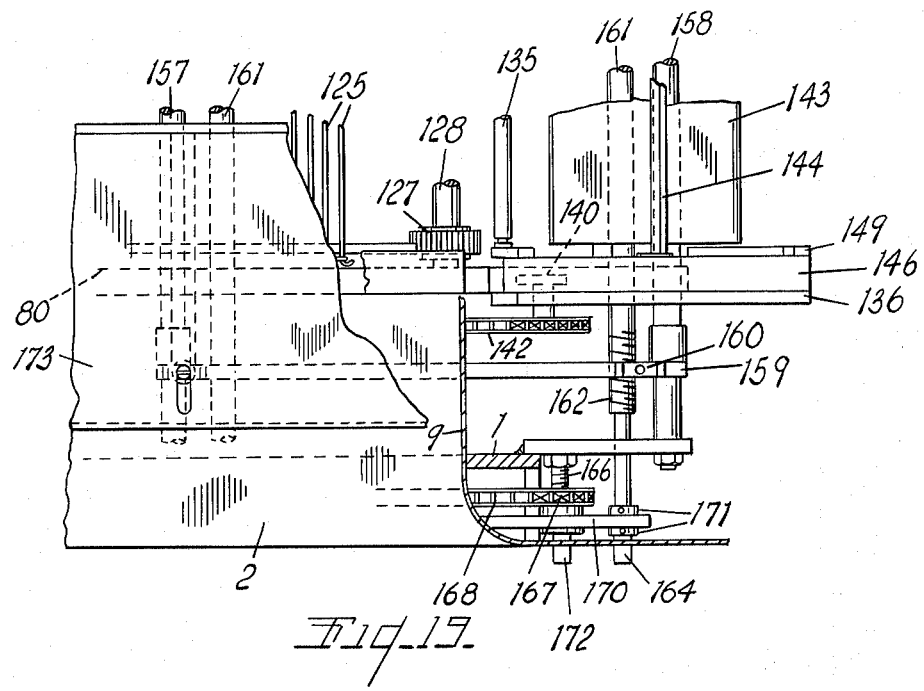
Fig. 19.
INVENTOR.
Ronald Holt
BY
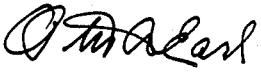
ATTORNEY United States Patent Office 3,208,321
Patented Sept. 28, 1965

3,208,321
BREAD SLICING MACHINE
Ronald Holt, Battle Creek, Mich., assignor to Battle Creek Packaging Machines, Inc., Battle Creek, Mich.
Filed Nov. 14, 1962, Ser. No. 237,613
24 Claims. (Cl. 83—201.11)

This invention relates to improvements in bread slicing machine. The principal objects of this invention are:

First, to provide a bread slicing machine which will slice loaves of bread at a substantially increased rate.

Second, to provide a slicing machine which is adjustable to handle loaves of varying sizes and produce slices of variable thickness without damage to the loaves in any of the adjusted positions of the machine.

Third, to provide a novel means for feeding loaves of freshly baked soft bread rapidly through a plural blade slicing assembly without damage to the loaves or the slices.

Fourth, to provide a novel form of feeding mechanism for rapidly advancing successive loaves of bread under individual accurate control of the loaves so that the loaves are presented accurately and rapidly to the blades of the slicing machine.

Fifth, to provide a novel arrangement of blade guides for the blades of a slicing machine which accurately steadies and guides the blades in various adjusted positions for rapid delivery of loaves of bread through the guides.

Sixth, to provide a bread slicing machine with loaf feeding mechanism that moves each loaf rapidly and individually through the slicing blades for the major portion of the width of the loaf under positive mechanical control and without engagement with a succeeding loaf of bread.

Seventh, to provide a novel form of conveying and feeding mechanism for a bread slicing machine which will accept freshly baked loaves of bread in irregularly timed relation and rapidly accelerate the several loaves and separate one loaf from another to obtain individual timed mechanical control of the loaves and advance them through the blades of the slicing machine.

Other objects and advantages of the invention will be apparent from a consideration of the following description and claims. The drawings, of which there are ten sheets, illustrate a highly practical form of the bread slicing machine of the invention.

FIG. 1 is a perspective view of the slicing machine viewed from the rear or intake end and what may be considered the front side of the machine.

FIG. 2 is a side elevational view of the machine viewed from the back side with the casing panels removed.

FIG. 3 is a fragmentary enlarged side elevational view of the blade guide supporting and adjusting mechanism of the machine.

FIG. 4 is a fragmentary elevational view of the blade guide assembly shown in FIGS. 2 and 3 and viewed from the rear or intake side of the machine, portions of the multiple parts and the several slicing blades being omitted to better illustrate arrangement of the structure.

FIG. 5 is a fragmentary top plan view of the driving connections to the blade guide adjusting mechanism shown in FIG. 4, the view being a top plan view of the structure in the upper right hand corner of FIG. 4.

FIG. 6 is a fragmentary enlarged rear elevational view of the center of the upper blade guide mechanism appearing in FIG. 4 again with several of the multiple parts of the mechanism omitted.

FIG. 7 is a fragmentary cross sectional view taken along the plane of the line 7—7 in FIG. 6.

FIG. 8 is a fragmentary front elevational view of one pair of blade guide fingers in working engagement with one blade of the slicing machine.

FIG. 9 is a fragmentary longitudinal cross sectional view through the bread advancing or delivering conveyor assembly of the machine the view being taken along the plane of the line 9—9 in FIGS. 10 and 11.

FIG. 10 is a fragmentary transverse cross sectional view through the intermediate bread feeding conveyor, the view being taken along the plane of the lines 10—10 in FIGS. 2 and 9.

FIG. 11 is a fragmentary transverse cross sectional view through the final loaf feeding conveyor of the machine taken along the plane of the line 11—11 in FIG. 9.

FIG. 12 is a fragmentary plan view of the adjustable supporting elements for the loaf guides by means of which the machine is adjusted for handling loaves of different lengths and for centering the loaves relative to the slicing blades so that the end slices are approximately of equal thickness. Conveyor elements and guide elements which overlie the mechanism have been omitted to better illustrate the adjusting function.

FIG. 13 is an enlarged fragmentary plan view of the control gate and actuating mechanism therefor for controlling the transfer of loaves from the supply conveyor to the intermediate conveyor and obtaining positive individual control of the loaves. Overlying side guides and portions of the conveyors have been omitted.

FIG. 14 is a fragmentary back side elevational view shown in projected relation from the structure shown in FIG. 13.

FIG. 15 is a fragmentary vertical cross sectional view taken along the plane of the line 15—15 in FIG. 13 and illustrating the guide mechanism in forwardly tilted loaf releasing position.

FIG. 16 is an enlarged cross sectional view taken along the plane of the line 16—16 in FIG. 17 and illustrating the gate operating cam.

FIG. 17 is a fragmentary vertical cross sectional view through the gate supporting and operating elements taken along the planes of the broken lines 17—17 in FIGS. 14 and 16.

FIG. 18 is a schematic wiring diagram of the electrical controls associated with the gate mechanism of FIGS. 13 to 17.

FIG. 19 is a fragmentary top plan view of the machine at the junction of the intermediate loaf forwarding conveyor and the final feeding conveyor to the slicing blades with portions of the structure omitted.

FIG. 20 is a fragmentary vertical cross sectional view taken along the plane of the line 20—20 in FIG. 4.

FIG. 21 is a fragmentary vertical cross sectional view taken along the plane of the line 21—21 in FIG. 4.

The general arrangement and major components of the slicing machine are shown in FIGS. 1 and 2 in which a box-like rectangular frame 1 enclosed by suitable body panels 2 supports a supply conveyor 3 for delivering loaves to the other elements of the machine. 4 represents a delivery conveyor which may extend to a source of the bread such as a bread cooler. Adjustable side guides 5 accept and deliver the loaves in side by side adjacent relation to and through the intermediate accelerating conveyor 6 and a final loaf conveyor 7 which delivers the loaves through the slicing blades which are mounted in the inclined blade support frame 8. The frame 8 is also desirably enclosed in outer body panels 9 as appears in FIG. 1. A blade guide assembly 10 to be described in greater detail presently is supported in the frame 8 and the sliced loaves after passing through the blades are deflected downwardly by weight biased deflectors 11 onto an off feeding conveyor 12 for delivery to a suitable wrapping machine. The invention involves the details of the conveyor system 3, 6 and 7 for rapidly accelerating and controlling the movement of the loaves through the slicing blades, and the arrangement of the side guides 5 and blade guide assembly 10 for relatively positioning the blades and loaves to handle the bread at a high rate of speed. A machine embodying the features disclosed has successfully sliced freshly baked bread at the rate of 120 loaves per minute.

The actual cutting elements of the slicing machine are a plurality of flexible band saw blade loops 13 trained over an upper supporting roll 14 and upper guide roll 15 and extending in inclined planes downwardly and rearwardly to a lower guide roll 16 and a lower driven roll 17. The guide rolls 15 and 16 are offset rearwardly slightly so that the intermediate working reaches 18 of the blades are staggered slightly longitudinally of the machine. The drum 17 and the slicing blades are driven independently by the motor 19. The conveyor elements 3, 6 and 7 are driven in timed relation as will be described presently from an independent source such as the drive shaft 20 (see FIG. 2) which may be conveniently coupled to a wrapping machine to synchronize the operation of the slicing machine to the wrapping machine.

*Blade guide support and adjusting mechanism*

In order to successfully handle various sizes of loaves of bread at the high speed mentioned, it is necessary that the working reaches 18 of the several band saw blades be accurately and steadily guided in all adjusted position of the machine. The mechanism for supporting and guiding the blades is shown more clearly in FIGS. 3 to 8. The blade guide assembly 10 consists of inclined generally upright side frame members 21 connected by an upper cross piece 22, intermediate cross piece 23 and lower cross piece 24. The frame formed by the elements 21 to 24 is removably attached to the rear upright of the frame 6 by the hangers 25 and 26. Left side frame 21 bolts directly to a side panel at 260.

With particular attention to FIGS. 4, 5 and 20 it will be seen that the side frame members 21 support an upper left bearing bracket 27 and an upper right bearing bracket 28 with the upper cross piece 22 bolted between the rear sides of the brackets. The cross piece 22 has been broken away from FIG. 4 to better illustrate the structure therebehind. The brackets 27 and 28 incline laterally inwardly and rearwardly from the side frame members 21 and rotatably support the upper ends of adjusting screws 29. The lower ends of the adjusting screws are journaled in bearing brackets 30 also secured to the side frame members 21. The upper ends of the screws 29 carry bevel gears 31 meshing with bevel gears 32 on the cross shaft 33 and the shaft 33 is fixedly supported by bearings 34 formed on the upper inner ends of the castings 27 and 28. The rear end of the shaft 33 is squared as at 35 and is adapted to receive a tool for simultaneously rotating the adjusting screws 29.

Adjustably carried by the screws 29 is an upper blade guide frame consisting of upright bars or rails 36 connected at the top by spaced cross pieces 37 and at the bottom by spaced cross pieces 38. An intermediate front cross piece 39 connects the mid-section of the side rails. At their lower ends the side rails are provided with outwardly extending brackets 40 which slide freely on the lower ends of the adjusting screws 29 and toward the upper ends the side bars are provided with brackets 41 threadedly engaged with the adjusting screws as traveling nuts so that rotation of the screws raises or lowers the upper blade guide frame. This vertical adjustment of the upper blade guide frame accommodates loaves of different height or thickness and maintains the upper blade guides to be described presently in close vertically spaced position above the tops of the loaves.

The lower blade guide assembly is vertically fixed and consists of the lower cross bar 23 which more specifically includes two spaced cross plates 42 secured to the front and rear sides of side brackets 43 and 44. The brackets are fixedly secured to the side frame members 21 and correspond in function to the cross bars 38 in the upper blade guide assembly.

Spaced below the cross bars 42 and forming the lower cross member 24 are a fourth pair of spaced cross bars 45 fixedly carried by the side frame members 21. The right ends of the cross bars 45 are secured to the right frame member through a casting 46 which forms a journal and gear box for the lower slice thickness adjusting screw 47 and the mating bevel gears 48 driven thereby. The left end of the screw is supported in a suitable bearing 49 secured to the left frame member 21 between the cross bars 45. The right end of the adjusting screw projects from the rear of the machine and is adapted to be turned to vary the spacing between the several saw blades for adjusting the thickness of the slices into which the bread is cut. The bevel gears 48 drive an upright connecting shaft 50 extending along the right side frame member 21 to an upper pair of bevel gears 52 driving an upper adjusting screw 53 supported between the cross bars 37 of the upper blade guide assembly. The bevel gears 52 move upwardly and downwardly with the vertical adjustment of the upper blade guide assembly with the keyed connection 54 (see FIG. 5) permitting this motion relative to the upright shaft 50. A bracket 55 secured to the upper end of the right frame member 36 and movable up and down therewith supports the right end of the top adjusting screws 53 and has a projecting arm 56 slidably embracing the upper end of the shaft 50 and supporting the bevel gears 52 in driving engagement.

The slice thickness adjusting elements carried by the vertically adjustable upper cross members 37–38 and the lower fixed cross members 42 and 45 are identical and reversed so a description of one assembly will suffice. The adjusting screws 53 and 47 are reversely threaded at their opposite ends as at 57 and threadedly engaged in traveling nuts 58 which move laterally oppositely inwardly and outwardly as the screws are simultaneously rotated by the driving connections through the bevel gears 48 and 52 just described. The traveling nuts 58 are guided and restrained against rotation by the spaced cross members 37 and 45 and have ears to which links 59 are pivotally connected. The laterally inner ends of the links 59 are pivotally connected to the swinging ends of a pair of spacing levers 60 and 61 in each adjusting assembly. The levers 60 and 61 are pivotedly supported on transversely and longitudinally spaced pivot blocks 62 and 63 carried near the centers of the cross bars 38 and 42. Rotation of the adjusting screws 53 and 57 thus causes the spacing levers to move between the upright adjacent positions illustrated in full lines in FIG. 4 and the inclined positions indicated by dotted lines and it is particularly pointed out that the levers 60 and 61 move in crossing relation to the dotted positions 60A and 61A indicated.

Fixedly supported between the cross bars 38 and 42 of the two adjusting assemblies are smooth slide rods 64 having a plurality of guide blocks or blade guide holders 65 slideably mounted thereon. A guide block 65 is provided for each working reach of the slicing blades 18 in each of the slice width adjusting assemblies, but only part of the guide blocks are illustrated to better disclose their operating connections. With particular reference to FIGS. 6 and 7, it will be noted that the guide blocks have ears 66 which project longitudinally of the machine into slidable guiding engagement with slots formed in the cross bars 38 or correspondingly in the cross bars 42 in the case of the lower adjusting assembly. The guide blocks have axially projecting conical portions 67 which project outwardly toward the sides of the machine and contact the slide rods 64 in laterally spaced relation to the guiding engagement of the ears 66 with the cross bars. The slide blocks are thus stably and slidably supported at three spaced points to prevent rocking or tilting in any direction. The conical projection 67 of one guide block receives or nests over the projection on the adjacent guide block so that the blocks can be moved into close side by side relation as shown in full lines in FIG. 4 or spaced apart as shown in FIG. 6. A fixed central guide block 68 is carried in the center of each slide bar 64.

The guide blocks 65 and 68 are slotted as at 69 on their inwardly projecting ends and each receives a finger support member or block 70, one end of which constitutes a tongue removably held in place by means of cross pins 71 extending across the slot in each guide block 65 and 68 and a tie rod 72 slid transversely through the several guide blocks. The finger support members or blocks 70 have depending arms or posts 73 and are notched on opposite sides forming seats 731 to receive the ends of blade guide fingers 74. The fingers 74 are thus offset laterally and vertically as appears most clearly in FIGS. 7 and 8 and have opposed facing concave surfaces 75 which guidingly engage the opposite sides of each working reach of the several slicing blades 18. The coacting guiding surfaces 74 being offset from each other are self cleaning and prevent the jambing of crumbs between the guides and the blades.

In order to effect the lateral adjustment of the guiding blocks 65 and corresponding adjustment of the spacing between the pairs of blade guide fingers, each guide block 65 has a notch 76 formed in its vertically exterior edge and the notch receives the interior end of an inclined drive bar 77 which is secured to the guide block by a cross pin 78. There is a separate drive bar 77 for each guide block 65 and these have been designated 77A, B, C, etc. The interior drive bars are short due to their close proximity to the spacing levers 60 and 61 and the vertically exterior ends of the drive bars are pivotally connected to the spacing levers by the spaced pivots 78. Due to the close proximity of adjacent drive bars 77 they are overlapped longitudinally of the machine as appears most clearly from FIGS. 6 and 7 with the pivots 78 supported between spaced elements 61 and 610 of the spacing levers.

It will be apparent from the geometry of the spacing levers 60–61, and the several inclined drive bars 77, that tilting of the spacing levers 61—61 results in proportionately spacing the several guide blocks 65 at equal but variable distances from the fixed central guide blocks 68. The several working reaches of the slicing blades 18 are accordingly adjustably but firmly guided in equally spaced planes for cutting slices of variable thickness from the loaves of bread. The slice width adjustment is effected simultaneously in the upper and lower guide assemblies and the upper guide assemly can be vertically adjusted as previously described to accommodate loaves of different height or thickness.

Loaf feeding and timing mechanism

The loaf feeding and timing operation is effected by the three conveyors 3, 6 and 7 located to the rear or infeeding end of the machine. These are all mounted in the main frame 1 of the machine on a conveyor subassembly having side frame castings 80. The castings and the subassembly are supported on cross pieces 81 and 82.

Supply conveyor

The supply conveyor 3 appears in FIGS. 1, 2, 9, 13 and 14 and consist of a loop of transverse wire grids or links 83 interlocked at their ends in a well known manner. The grids of the loop are trained over idler sprockets 84 at the rear of the machine and drive sprockets 85 on the shaft 86 intermediate the ends of the sub-frame members 80. Surface clips 87 or similar means are provided flexibly bridging the gaps between the links so that loaves of bread may slide relative to the surface of the conveyor without damage to the loaves.

The shaft 86 is driven (see FIGS. 9 and 14) by a sprocket 88 and chain 89 from the sprocket 90 on the cross shaft 91 of the intermediate conveyor, the chain and sprockets being located toward the front side of the machine. It is particularly pointed out that the sprocket 90 is smaller than the sprocket 88 so that the supply conveyor operates at a slightly slower lineal speed than the intermediate conveyor 6.

Control gate

With reference to FIGS. 2, 9 and 14 it will be seen that the supply conveyor 3 is slightly (about three quarters of an inch) below the intermediate conveyor 6. Loaves do not pass uncontrolled between the two conveyors. A two part transverse gate consisting of an upper gate 92 and a lower gate 93 is supported on a transverse pivot axis between the two conveyors. The side frame members 80 are notched to receive the tubular bearings 94 retained in position by a cover plate 95 and the bearings support a pivot shaft 96 which on the rear side of the machine projects laterally from the conveyor assembly and carries a crank arm 97. On their inner ends the pivot pins 96 carry enlarged circular collars 98 which are radially slotted at 98A to receive depending legs 92A on the ends of the upper gate 92. The lower gate 93 is pivotally supported on studs 99 projecting inwardly from the collars 98 so that both gates pivot independently about the same axis. A link 100 depending from the crank arm 97 is pivotally connected to a cam lever 101 having a follower roll 102. A second link 103 is pivotally connected to the back of the lower gate and extends downwardly to a crank arm 104 on the rock shaft 105. The shaft extends rearwardly through the side frame to a second crank arm 106 and the latter crank arm is pivotally connected to a second cam lever 107 having a follower roll 108. The cam levers are pivotally supported on the bracket 109 at 110 and are constantly urged downwardly by springs 111. Both the upper and lower gates are accordingly biased forwardly to inclined position as shown in full lines in FIG. 15.

The gates are moved to upwardly projecting position as shown in full lines in FIGS. 13, 14 and 17 by an adjustable cam assembly mounted on the end of a cam shaft 112 projecting to the rear side of the conveyor sub-frame.

As appears most clearly from FIGS. 16 and 17 the cam assembly consists of a central hub and disk 113 rotatively driven by the shaft and provided with a rear or outer adjustable cam disk 114 and a front or inner cam disk 115. An anchor plate 116 is pinned to the end of the shaft 112 and carries a spring pressed pin 117 selectively engageable with one of three angularly spaced holes 118 in the outer cam plate 114. The outer cam plate or disk 114 has a circumferential raised or lift surface 119 (see FIG. 16) which is adjustable as an extension of the lift surface 120 on the central cam disk 113 and the three adjustments between the three holes 118 provide variable timing for the gates 92 and 93 to accommodate loaves of different transverse widths or thicknesses. The inner cam disk or plate 115 is adjustably secured to the inner front side of the cam disk 113 by means of clamp screws 121 carried by the outer disk 114 and projecting through arcuate slots 122 in the central cam disk. The inner cam disk 115 has an outer peripheral lift 123 which is a continuation of the lifts 119 and 120 but which rises from its retracted surface along the incline 124 which can be angularly adjusted within the limits of the slots 122.

The inner cam lever 107 and follower roll 108 are thus controlled by the inner cam disk 115 to raise the lever 107 and the lower gate 93 at an adjustably variable time before the lift 119 on the outer cam plate correspondingly raises the follower roll 102 and the cam lever 101 to raise the upper gate. Both cam lifts and both gates tend to fall simultaneously along the trailing surface of the lift 120 on the central cam plate.

The action of the cams and gates is timed as will be more particularly described to intermittently lower both gates 92 and 93 with each rotational cycle of the cams at which time a loaf of bread held against the back side of the gates by sliding action on the supply conveyor 3 will be carried forwardly and up the incline of the retracted gates to the level of the intermediate conveyor 6. Prior to complete passage of the loaf over the tilted gates, the lower gate 93 under the influence of the inner cam 115 and the lift 124 will be raised and in so doing will lift the bottom surface of the loaf in transit across the gates. The lower gate thus assists in elevating the loaf to the high level of the intermediate conveyor and at the same time assumes an upright blocking position where it will intercept a succeeding loaf which may be following closely behind the first loaf. Shortly after the lower gate has raised, the upper gate is raised by the outer cam plate 114 to further elevate the rear edge of the initial loaf of bread and assist the lower gate in intercepting and stopping a succeeding loaf. The gates and the timing cams which are operated in timed relation with the intermediate conveyor 6 thus achieve separation between successive loaves on the supply conveyor and initiate individual control of each loaf advanced to the slicing blades.

*Intermediate conveyor*

The intermediate conveyor 6 is a link belt or wire rod conveyor having links 125 which are driven by sprockets 126 on the previously described cross shaft 91. The forward leading end of the conveyor 6 is supported and driven by sprockets 127 on the cross shaft 128 and that shaft is driven by the chain 129 from the cross shaft 130. With reference to FIGS. 10 and 2 it will be noted that the shaft 130 also drives the cam shaft 112 through the chain 131 and since the supply conveyor is driven from the intermediate conveyor by the chain 89 both the supply and intermediate conveyors and the cam shaft are driven in timed relationship.

The intermediate conveyor 6 has a plurality of spaced flights or pusher bars 132 tiltably mounted thereon and weight biased to tilt rearwardly as at 132A in FIG. 9 where the flight bars move upwardly ahead of the gates at the infeeding or receiving end of the intermediate conveyor. The flights 132 thus offer more resistance or obstruction to the transfer of an incoming loaf onto the intermediate conveyor, but as will be pointed out the flights are timed to advance to the upper reach of the conveyor after each loaf has been deposited on the conveyor and the gate 92 had been raised.

Intermediate of the ends of the intermediate conveyor there is provided a support platform 133 which intercepts and raises the depending legs 134 on the flight bars and raises the flight bars to upright bread forwarding position as indicated at 132B in FIG. 9. Absolute individual control of the spaced loaves of bread is thus achieved with the faster travel of the intermediate conveyor providing the time and space necessary to accelerate and successively separate the loaves on the supply conveyor. As the flight bars 132 deliver each loaf from the leading end of the intermediate conveyor they pass beyond the supporting plate 133 and tilt rearwardly to pass downwardly along the front end of the conveyor without interfering with the support roll 135. Independently supported retarding fingers 236 mounted in the side rails adjacent the leading end of the intermediate conveyor assure that each loaf is firmly backed against its advancing flight bar 132 as it leaves the intermediate conveyor.

*Final feeding conveyor*

The loaves that are advanced in rapidly and accurately timed and spaced relation by the intermediate conveyor are actually thrown over the transverse roll 135 to the final feeding conveyor 7. With particular reference to FIGS. 9 and 11 and 19 it will be noted that the further ends of the sub-frame members 80 and plates 136 secured thereto project forwardly to closely adjacent the working reaches 18 of the slicing blades and the blade guide support assembly. The plates 136 carry inwardly projecting studs 137 which support generally rectangular guide plate 138 in spaced relation to the side plates. The side plates 136 also carry stub shafts 139 at the four corners of the plates which carry sprockets 140 with spaced chain loops 141 trained therearound between the side plates and the guide plates 138. The lower rear sprockets 140 are driven by chains 142 from the previously described cam shaft 130 to operate in timed relationship with the other conveyors of the system. A downwardly and forwardly inclined feed table 143 is supported between the guide plates 138 below the upper reach of the chain loops 141.

Bread thrown forwardly across the transfer roller 135 is deposited on the feed table 143 and is immediately picked up and forwarded by one of three feeding flight bars 144 continuously advanced by the chain loops 141. The flight bars 144 have mounting and guide shoes 145 secured to and projecting from the ends of the flight bars in perpendicular trailing relation to the flight bars. These shoes 145 travel along the upper and lower edges of the guide plates 138 maintaining the flight bars in upright loaf feeding position. To assist the guide plates 138, upper guide bars 146 and lower guide bars 147 are further secured to the edges of the side plates 136. The shoes 145 are pivotally connected by pins 148 to the chain loops 141 and as the shoes leave the upper supporting surface of the guide plates 138, the shoes and the flight bars 144 carried thereby tend to trail rearwardly while the ends of the flight bars contact upright guide bars 149 secured in inclined positions between the forward ends of the bars 146 and 147. The flight bars 144 can thus approach in close controlled proximity to the supporting guide bars 42 of the lower blade guide assembly. The feeding conveyor 7 and its flight bars 144 thus advance the individual loaves rapidly and uniformly over half the thickness of the loaves past the working reaches 118 of the blades. The final feeding motion of each loaf past the blades is achieved by pressure from a succeeding loaf but the loaf has already been sliced through a substantial portion of its width and the feeding and slicing motion is accomplished without deforming or crumbing soft loaves of freshly baked bread.

It is pointed out that the sprockets 140 driven by the drive chains 142 are smaller than the driving sprockets on the drive shaft 130 so that the chain loops 141 and the flight bars 144 are driven at a still faster rate of speed than the flight bars 132 on the intermediate conveyor. The individual loaves of bread are thus advanced rapidly and in controlled manner against the slicing blades during the initial portion of the slicing operation rather than being pressed irregularly by succeeding loaves which may clutch or deflect unevenly in feeding the initial loaf to the blades.

*Timing mechanism*

As was previously pointed out the gates 92 and 93 are actuated in timed relationship with the flight bars 132 by the cams 115 and 114 but in order to insure that a loaf of bread is ready and immediately available at the gates to enter onto the intermediate conveyor ahead of each flight bar, the cam lever 101 which controls the upper gate is provided with a laterally projecting pin 151 which projects into the pivoted hooks 152 suspended from the side member 80 to interrupt and prevent downward tilting of the gate. A spring 153 urges the hook into engagement with the pin and the gate will not lower regardless of the position of the cams until the hook 152 is retracted by the solenoid 154. A loaf sensing electric switch 155 is positioned in the side rail just behind the gate 92 and connected in series with the solenoid 154. A second switch 156 is mounted on the cross bar 82 to be actuated by a cam 157 on the shaft 130 (see FIG. 10) so that both the switch 156 and the switch 155 must be closed simultaneously to retract the hook 152 when the cams are in proper position to lower the gates. Should a loaf of bread arrive on the supply conveyor too late in the rotational cycle of the flight bars 132 to fall accurately ahead of a flight bar, the switch 156 will indicate the out of cycle relation of the incoming loaf so that the gate 92 holds the loaf for the next succeeding flight bar pocket on the intermediate conveyor.

Width and loaf centering

The mechanism for adjusting the machine to slice loaves of different lengths and to further adjust the positions of the loaves so that both end slices or crusts are of equal thickness is shown most clearly in FIGS. 9, 12 and 19. It will be appreciated that there are enough blades 18 and blade guides 77 to slice the longest loaf for which the machine is designed and that when slicing shorter loaves, some of these blades run idle.

The conveyor side frame side members 1 are connected by two spaced cross rods 257 and 258 which act as cross slides. The slides laterally adjustably support side guide support rails 159 having two saddles 160 projecting upwardly thereabove. The front saddles are positioned opposite the mid-section of the feed conveyor 7 and the rear saddles are positioned opposite the mid-section of the intermediate conveyor 6. (See FIG. 9.) Extending slidably through the side frames 1 are two adjusting screws 161 having oppositely threaded portions 162 to move the support rails equally and oppositely inwardly and outwardly as the screws are rotated. The screws are connected on the front side of the machine by the chain and sprockets 163 and the rear end of the front screw is squared and extended through the casing of the machine as at 164.

In order to center or register the support rails relative to the end slices of loaves being cut, the rear end of the slide rod 157 is threaded as at 165 and a threaded stud 166 projects from the extension side member of the frame adjacent the front screw 161. A pair of sprockets 167 threadedly engaged with the threaded stud and rod are connected by a chain 168 and provided with collars 169 rotatably but axially drivingly engaging a drive plate 170. The drive plate engages collars 171 on the screws 161 to move the screws bodily axially as the sprockets move on the screws. One of the sprockets has a squared end 172 on its hub by means of which both sprockets can be threadedly adjusted. Both the screws 161 and the support rails can thus be moved laterally. The movement need not be more than one half the thickness of the slices being cut as this will assure that the two slicing blades in contact with the ends of the loaf will cut crusts of equal thickness.

The saddles 160 on the support rails 159 support loaf end guides 173 in the form of inverted U-shaped panels that overhang the side edges of the intermediate conveyor. (See FIGS. 1 and 10.) Connecting rods 174 secured to the saddles extend laterally inwardly to the inner edges of the loaf end guides and slide on fixed saddles 175 on the sub-frame members 80 as the support rails are adjusted. The end guide rails 176 which extend rearwardly alongside the supply conveyor and support the previously mentioned sensing switch 155 are connected to and adjusted with the loaf end guides. Non-driven, manually adjustable supports 177 support the rear ends of the guides 176.

Drive and operation

The drive for the slicing blades as described is independent from the motor 19. The drive to the conveyor system is connected at the input 20 and is coupled to a wrapping machine by the chain 178 with an on-off clutch control conventionally illustrated at 179 (FIG. 10). The clutch drives the shaft 180 which in turn drives shaft 130 through the chain 181. Chain 282 drives the off-feed conveyor while chain 131 from the shaft 130 drives the cam shaft 112. Chain 129 drives the intermediate conveyor 6 while two chains 142 just outside of the sub-frame members 80 drive the feed conveyor 7. Two drives to the feed conveyor are needed as the two chain loops 141 are not connected by a cross shaft being mounted on the stub shafts 139.

Blade guide removability

Both the upper and lower blade guide assemblies are easily removable to facilitate replacement of cutting blade bands or cleaning or repair of the guides themselves. With particular reference to FIGURES 4 and 21, it will be noted, first with respect to the upper blade guide assembly, that the ends of the cross guide bars 38 and the slide rod 64 are rigidly connected to blocks 182 having notches 183 on their undersides that rest on rounded studs 184 secured to the sides of the side frame bars 36. Hold-down clamps or blocks 185 secured in place by thumb screws 186 releasably hold the ends of the upper blade guide frame assembly 38, 64 in place. By removing the thumb screws 186 and the blocks 185 the entire assembly can be lifted clear of the studs 184 and moved bodily rearwardly of the machine or to the left as appears in FIG. 21. This movement naturally slides the individual blade guide fingers 74 away from the cutting reaches of the blades 18 (to the right as viewed in FIG. 7).

The lower blade guide assembly has its transverse guide bars 42 and guide pin 64 rigidly connected to end blocks 187 resting on pins 188 secured to the inner sides of the fixed castings 43 and 44. Hold-down blocks 189 removably secured in place by clips 190 and thumb screws 191 threaded into the castings hold the lower assembly in place but similarly permit its removal as a unit by loosening the screws 191 and clips 190 to remove the hold-down blocks and permit lifting the lower frame and the guide fingers carried thereby from the frame 10.

When the blade guide assembly frames are removed as units it is of course necessary to disconnect the spacing levers 60 and 61 from the slice thickness adjusting links 59 which remain connected to the traveling nuts 58 on the adjusting screws 57. For this purpose, spring pressed collars 192 on the links 59 releasably connect the links to pivot pins 193 at the outer or swinging ends of the spacing levers 60 and 61. It will be recalled from FIG. 7 that the levers 60 and 61 are each double thickness parts as at 61 and 610 and the pins 193 extend between and are supported by the spaced ends of these parts to be releasably and drivingly engaged by a catch (not illustrated in detail) on the spring pressed collars 192. Support and guide plates 194 on frame members 37 and 24 have holes 195 therein receiving pins for holding the links 59 in retracted position when the links are inoperative so that the links will not interfere with removal of the blade guide assemblies or swing accidentally into contact with the slicing blades which are quite closely adjacent.

What is claimed as new is:
1. A bread slicing machine comprising,
 a plurality of parallel saw bands having working reaches inclined from the vertical,
 a loaf feeding conveyor including chain loops with upper reaches extending normally toward the upper sides of the working reaches of said bands and with downwardly advancing and rearwardly inclined reaches traveling in front of said bands,
 flight bars rockably supported between said chain loops,
 a guide means positioned at each end of said flight bars causing said bars to project in bread feeding position while advancing to said blades and to tilt rearwardly in passing down in front of said blades,
 an intermediate conveyor having an upper horizontal reach terminating adjacent and at the level of the rear end of said upper reach of said feeding conveyor,
 other flight bars tiltable on said intermediate conveyor,
 guide means coacting with said other flight bars to tilt said other flight bars to outwardly projecting bread feeding position at a point intermediate the ends of the upper reach of the intermediate conveyor and permit rearward tilting of the other flight bars at the leading end of the intermediate conveyor, a supply conveyor having an upper reach terminating adjacent and slightly below the trailing rear end of the upper reach of said intermediate conveyor and having a smooth surface on which bread may slide, a double gate having a low portion and a high portion each extending transversely between the adjacent ends of said supply conveyor and said intermediate conveyor and swingable forwardly to a leading position adjacent the rear end of the intermediate conveyor, a primary drive element having a cycle timing cam thereon and connected to drive said feed conveyor at a faster lineal speed than said intermediate conveyor and to drive said intermediate conveyor at a faster lineal speed than said supply conveyor, said flight bars on said feeding conveyor and intermediate conveyor being spaced to receive single loaves of bread therebetween and timed to continuously advance the loaves along the conveyors, yieldable loaf retarders positioned alongside said intermediate conveyor to urge loaves rearwardly against the flight bars on the intermediate conveyor, cams driven by said primary drive member and connected to tilt said gates up and down, means arranged to adjust said last cams relative to each other to raise the lower gate before the higher gate, solenoid operated means positioned to block lowering of said gates, a loaf sensing switch positioned adjacent the leading end of said supply conveyor, a cycle switch positioned to be actuated by said cycle timing cam after each flight bar on said intermediate conveyor passes said gates, said switches being connected in series with said solenoid operated means to prevent lowering of said gates and entry of a loaf of bread onto said intermediate conveyor until there is an empty pocket ahead of a flight bar on the conveyor to receive the loaf released by the gates, laterally adjustable side guides mounted alongside said conveyors, and laterally adjustable guide means engageable with said working reaches of said blades to equally adjust the spacing between said working reaches.

2. A bread slicing machine comprising, a plurality of parallel saw bands having working reaches inclined from the vertical, a loaf feeding conveyor including chain loops with upper reaches extending normally toward the upper sides of the working reaches of said bands and with downwardly advancing and rearwardly inclined reaches traveling in front of said bands, flight bars rockably supported between said chain loops, guide means causing said bars to project in bread feeding position while advancing to said blades and to tilt rearwardly in passing down in front of said blades, an intermediate conveyor having an upper reach terminating adjacent the rear end of said upper reach of said feeding conveyor, other flight bars tiltable on said intermediate conveyor, guide means coacting with said other flight bars to tilt said other flight bars to outwardly projecting bread feeding position at a point intermediate the ends of the upper reach of the intermediate conveyor and permit rearward tilting of the other flight bars at the leading end of the intermediate conveyor, a supply conveyor having an upper reach terminating adjacent and slightly below the trailing rear end of the upper reach of said intermediate conveyor and having a smooth surface on which bread may slide, a double gate extending transversely between the adjacent ends of said supply conveyor and said intermediate conveyor and swingable forwardly to a leading position adjacent the rear end of the intermediate conveyor, a primary drive element having a cycle timing cam thereon and connected to drive said feed conveyor at a faster lineal speed than said intermediate conveyor and to drive said intermediate conveyor at a faster lineal speed than said supply conveyor, said flight bars on said feeding conveyor and intermediate conveyor being spaced to receive single loaves of bread therebetween and timed to continuously advance the loaves along the conveyors, cams driven by said primary drive member and connected to tilt said gates up and down, means arranged to adjust said last cams relative to each other to raise the lower gate before the higher gate.

solenoid operated means positioned to block lowering of said gates, a loaf sensing switch positioned adjacent the leading end of said supply conveyor, a cycle switch positioned to be actuated by said cycle timing cam after each flight bar on said intermediate conveyor passes said gates, said switches being connected in series with said solenoid operated means to prevent lowering of said gates and entry of a loaf of bread onto said intermediate conveyor until there is an empty pocket ahead of a flight bar on the conveyor to receive the loaf released by the gates, laterally adjustable side guides mounted alongside said conveyors, and laterally adjustable guide means engageable with said working reaches of said blades to equally adjust the spacing between said working reaches.

3. A bread slicing machine comprising, a plurality of parallel saw bands having working reaches inclined from the vertical, a loaf feeding conveyor including chain loops with upper reaches extending downwardly toward the upper sides of the working reaches of said bands and with downwardly advancing and rearwardly inclined reaches traveling in front of said bands, flight bars rockably supported between said chain loops, guide means positioned at each end of said flight bars causing said bars to project in bread feeding position while advancing to said blades and to tilt and remain upright in passing down in front of said blades, an intermediate conveyor having an upper horizontal reach terminating adjacent and at the level of the rear end of said upper reach of said feeding conveyor, other flight bars tiltable on said intermediate conveyor, guide means coacting with said other flight bars to tilt said other flight bars to outwardly projecting bread feeding position at a point intermediate the ends of the upper reach of the intermediate conveyor and permit rearward tilting of the other flight bars at the leading end of the intermediate conveyor, a supply conveyor having an upper reach terminating adjacent the trailing rear end of the upper reach of said intermediate conveyor and having a smooth surface on which bread may slide, a gate extending transversely between the adjacent ends of said supply conveyor and said intermediate conveyor and swingable forwardly to a leading position adjacent the rear end of the intermediate conveyor, a primary drive element having a cycle timing cam thereon and connected to drive said feed conveyor at a faster lineal speed than said intermediate conveyor and to drive said intermediate conveyor at a faster lineal speed than said supply conveyor, said flight bars on said feeding conveyor and intermediate conveyor being spaced to receive single loaves of bread therebetween and timed to continuously advance the loaves along the conveyors, yieldable loaf retarders positioned alongside said intermediate conveyor to urge loaves rearwardly against the flight bars on the intermediate conveyor, a cam driven by said primary drive member and connected to tilt said gate up and down, means arranged to adjust said cam relative to the position of said flight bars to lower the gate at different times after a flight bar passes the supply conveyor, solenoid operated means positioned to block lowering of said gate, a loaf sensing switch positioned adjacent the leading end of said supply conveyor, a cycle switch positioned to be actuated by said cycle timing cam after each flight bar on said intermediate conveyor passes said gates, said switches being connected in series with said solenoid operated means to prevent lowering of said gate and entry of a loaf of bread onto said intermediate conveyor until there is an empty pocket ahead of a flight bar on the conveyor to receive the loaf released by the gate, laterally adjustable side guides mounted alongside said conveyors, laterally adjustable guide means engageable with said working reaches of said blades to equally adjust the spacing between said working reaches, and means for adjusting the side guides relative to each other and simultaneously relative to said blades.

4. A bread slicing machine comprising, a plurality of parallel saw bands having working reaches inclined from the vertical, a loaf feeding conveyor including chain loops with upper reaches extending downwardly toward the upper sides of the working reaches of said bands and with downwardly advancing and rearwardly inclined reaches traveling in front of said bands, flight bars rockably supported between said chain loop, guide means positioned at each end of said flight bars causing said bars to project in bread feeding position while advancing to said blades and to tilt and remain upright in passing down in front of said blades, an intermediate conveyor having an upper horizontal reach terminating adjacent and at the level of the rear end of said upper reach of said feeding conveyor, other flight bars tiltable on said intermediate conveyor, guide means coacting with said other flight bars to tilt said other flight bars to outwardly projecting bread feeding position at a point intermediate the ends of the upper reach of the intermediate conveyor and permit rearward tilting of the other flight bars at the leading end of the intermediate conveyor, a supply conveyor having an upper reach terminating adjacent the trailing rear end of the upper reach of said intermediate conveyor and having a smooth surface on which bread may slide, a gate extending transversely between the adjacent ends of said supply conveyor and said intermediate conveyor and swingable forwardly to a leading position adjacent the rear end of the intermediate conveyor, a primary drive element having a cycle timing cam thereon and connected to drive said feed conveyor at a faster lineal speed than said intermediate conveyor and to drive said intermediate conveyor at a faster lineal speed than said supply conveyor, said flight bars on said feeding conveyor and intermediate conveyor being spaced to receive single loaves of bread therebetween and timed to continuously advance the loaves along the conveyors, yieldable loaf retarders positioned alongside said intermediate conveyor to urge loaves rearwardly against the flight bars on the intermediate conveyor, a cam driven by said primary drive member and connected to tilt said gate up and down, means positioned to block lowering of said gate, a loaf sensing device positioned adjacent the leading end of said supply conveyor, a cycle timing device positioned to be actuated by said cycle timing cam after each flight bar on said intermediate conveyor passes said gates, said devices being connected in series with said blocking means to prevent lowering of said gate and entry of a loaf of bread onto said intermediate conveyor until there is an empty pocket ahead of a flight bar on the conveyor to receive the loaf released by the gate, laterally adjustable side guides mounted alongside said conveyors, laterally adjustable guide means engageable with said working reaches of said blades to equally adjust the spacing between said working reaches, and means for adjusting the side guides relative to each other and simultaneously relative to said blades.

5. A bread slicing machine comprising, a plurality of parallel saw bands having working reaches inclined from the vertical, a loaf feeding conveyor including chain loops with upper reaches extending downwardly toward the upper sides of the working reaches of said bands and with downwardly advancing and rearwardly inclined reaches traveling in front of said bands, flight bars rockably supported between said chain loop, guide means causing said bars to project in bread feeding position while advancing to said blades and to tilt rearwardly in passing down in front of said blades, an intermediate conveyor having an upper reach terminating adjacent the rear end of said upper reach of said feeding conveyor, other flight bars tiltable on said intermediate conveyor, guide means coacting with said other flight bars to tilt said other flight bars to outwardly projecting bread feeding position at a point intermediate the ends of the upper reach of the intermediate conveyor, a supply conveyor having an upper reach terminating adjacent the trailing rear end of the upper reach of said intermediate conveyor and having a smooth surface on which bread may slide, a gate extending transversely between the adjacent ends of said supply conveyor and said intermediate conveyor and swingable forwardly to a leading position adjacent the rear end of the intermediate conveyor, a primary drive element connected to drive said feed conveyor at a faster linear speed than said intermediate conveyor and to drive said intermediate conveyor at a faster linear speed than said supply conveyor, said flight bars on said feeding conveyor and intermediate conveyor being spaced to receive single loaves of bread therebetween and timed to continuously advance the loaves along the conveyors, means driven in timed relation to said drive element to tilt said gate up and down, and timed to lower said gate after each flight bar on said intermediate conveyor passes said gate, and raise said gate prior to complete passage of a loaf thereover, laterally adjustable side guides mounted alongside said conveyors, and laterally adjustable guide means engageable with said working reaches of said blades to equally adjust the spacing between said working reaches.

6. A bread slicing machine comprising, a plurality of parallel saw bands having working reaches inclined from the vertical, a loaf feeding conveyor including chain loops with upper reaches extending downwardly toward the upper sides of the working reaches of said bands and with downwardly advancing and rearwardly inclined reaches traveling in front of said bands, flight bars rockably supported between said chain loops, guide means causing said bars to project in bread feeding position while advancing to said blades and to tilt rearwardly in passing down in front of said blades, an intermediate conveyor having an upper reach terminating adjacent the rear end of said upper reach of said feeding conveyor, other flight bars tiltable on said intermediate conveyor, guide means coacting with said other flight bars to tilt said other flight bars to outwardly projecting bread feeding position at a point intermediate the ends of the upper reach of the intermediate conveyor, a supply conveyor having an upper reach terminating adjacent the trailing rear end of the upper reach of said intermediate conveyor and having a smooth surface on which bread may slide, a gate extending transversely between the adjacent ends of said supply conveyor and said intermediate conveyor and swingable forwardly to a leading position adjacent the rear end of the intermediate conveyor, a primary drive element connected to drive said feed conveyor at a faster lineal speed than said intermediate conveyor and to drive said intermediate conveyor at a faster lineal speed than said supply conveyor, said flight bars on said feeding conveyor and intermediate conveyor being spaced to receive single loaves of bread therebetween and timed to continuously advance the loaves along the conveyors, and means driven in timed relation to said drive element to tilt said gate up and down, and timed to lower said gate after each flight bar on said intermediate conveyor passes said gate, and raise said gate prior to complete passage of a loaf thereover.

7. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned horizontally wtih its end adjacent and between one quarter inch and one inch above the adjacent end of the supply conveyor, pivot supports positioned at the sides of the gap between said conveyors and below the top of said second conveyor, a low gate pivoted on said supports, a high gate pivoted on said supports and swingable over said low gate, separate lever means connected to separately swing said gates between upright loaf blocking position across the end of said first conveyor and forwardly inclined position up to the surface of said second conveyor, loaf advancing flights pivotally mounted on said second conveyor and swingable to rearwardly tilted trailing relation on the surface of said second conveyor while passing said gates, guide means positioned to raise said flights to projecting loaf advancing position at a point on said second conveyor spaced from said gates by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gates, a pair of cams angularly adjustably carried by said carrier, a pair of levers having cam followers engageable with said cams and connected to actuate said lever means to raise said lower gate befor said upper gate and lower said gates simultaneously after each flight bar passes said gates, means for securing said cams in angularly adjusted positions relative to said carrier to raise the gates prior to complete passage of loaves of varying width thereover, a movable support preventing lowering of said gates, and loaf sensing means positioned adjacent the end of said supply conveyor connected to actuate said support to prevent lowering said gates until there is a loaf at said gates and one of said bars is in position passing said gates.

8. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned with its end adjacent and above the adjacent end of the supply conveyor, pivot supports positioned at the sides of the gap between said conveyors and below the top of said second conveyor, a low gate pivoted on said supports, a high gate pivoted on said supports and swingable over said low gate, separate lever means connected to separately swing said gates between upright loaf blocking position across the end of said first conveyor and forwardly tilted position to the surface of said second conveyor, loaf advancing flights pivotally mounted on said second conveyor and swingable to rearwardly tilted trailing relation on the surface of said second conveyor while passing said gates, guide means positioned to raise said flights to projecting loaf advancing position at a point on said second conveyor spaced from said gates by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gates, a pair of cams angularly adjustably carried by said carrier, a pair of levers having cam followers engageable with said cams and connected to actuate said lever means to raise said lower gate before said upper gate and lower said gates simultaneously after each flight bar passes said gates, a movable support preventing lowering of said gates, and a loaf sensing means positioned adjacent the end of said supply conveyor connected to actuate said support to prevent lowering said gates until there is a loaf at said gates and one of said bars is in position passing said gates.

9. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned with its end adjacent and above the adjacent end of the supply conveyor, pivot supports positioned at the sides of the gap between said conveyors and below the top of said second conveyor, a low gate pivoted on said supports, a high gate pivoted on said supports and swingable over said low gate, separate lever means connected to separately swing said gates between upright loaf blocking position across the end of said first conveyor and forwardly inclined position up to the surface of said second conveyor, loaf advancing flights pivotally mounted on said second conveyor and swingable to rearwardly tilted trailing relation on the surface of said second conveyor while passing said gates, guide means positioned to raise said flights to projecting loaf advancing position at a point on said second conveyor spaced from said gates by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gates, a pair of cams angularly adjustably carried by said carrier, a pair of levers having cam followers engageable with said cams and connected to actuate said lever means to raise said lower gate before said upper gate and lower said gates simultaneously after each flight bar passes said gates, and means for securing said cams in angularly adjusted positions relative to said carrier to raise the gates prior to complete passage of loaves of varying width thereover.

10. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned with its end adjacent the end of the supply conveyor, pivot supports positioned at the sides of the gap between said conveyors, a low gate pivoted on said supports, a high gate pivoted on said supports and swingable over said low gate, separate lever means connected to separately swing said gates between upright loaf blocking position across the end of said first conveyor and forwardly tilted position to the surface of said second conveyor, loaf advancing flights pivotally mounted on said second conveyor and swingable to rearwardly tilted trailing relation on the surface of said second conveyor while passing said gates, guide means positioned to raise said flights to projecting loaf advancing position at a point on said second conveyor spaced from said gates by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gates, a pair of cams angularly adjustably carried by said carrier, a pair of levers having cam followers engageable with said cams and connected to actuate said lever means to raise said lower gate before said upper gate and raise said upper gate prior to complete passage of a loaf thereover and lower said gates simultaneously after each flight bar passes said gates, a movable support preventing lowering of said gates, loaf sensing means positioned adjacent the end of said supply conveyor connected to actuate said support to prevent lowering said gates until there is a loaf at said gates and one of said bars is in position passing said gates, and a third conveyor driven at a faster lineal speed than said second conveyor and having loaf advancing flights spaced to receive a single loaf therebetween and driven in timed relation to the flights on said second conveyor, said third conveyor delivering loaves in slicing relation part way through slicing blades positioned across the plane of said third conveyor.

11. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned with its end adjacent the end of the supply conveyor, pivot supports positioned at the sides of the gap between said conveyors, a low gate pivoted on said supports, a high gate pivoted on said supports and swingable over said low gate, separate lever means connected to separately swing said gates between upright loaf blocking position across the end of said first conveyor and forwardly tilted position to the surface of said second conveyor, loaf advancing flights pivotally mounted on said second conveyor and swingable to rearwardly tilted trailing relation on the surface of said second conveyor while passing said gates, guide means positioned to raise said flights to projecting loaf advancing position at a point on said second conveyor spaced from said gates by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gates, a pair of cams angularly adjustably carried by said carrier, and a pair of levers having cam followers engageable with said cams and connected to actuate said lever means to raise said lower gate before said upper gate and raise said upper gate prior to complete passage of a loaf thereover and lower said gates simultaneously after each flight bar passes said gates.

12. A loaf delivery system for a bread slicing machine comprising, a supply conveyor having a flat surface adapted to slide under loaves without damage to the loaves when movement of the loaves with the conveyor is obstructed, a second conveyor having an upper loaf supporting reach positioned adjacent the end of the supply conveyor, a gate pivoted between said conveyors, lever means connected to swing said gate between upright loaf blocking position across the end of said first conveyor and forwardly tilted position to the surface of said second conveyor, loaf advancing flights pivotally mounted on said second conveyor and swingable to rearwardly tilted trailing relation on the surface of said second conveyor while passing said gate, guide means positioned to raise said flights to projecting loaf advancing position at a point on said second conveyor spaced from said gate by at least the width of the loaves to be delivered, a drive member connected to drive both said conveyors with the second conveyor driven at a faster speed than the supply conveyor, a cam carrier driven by said drive member in timed cycle relation to the advance of each of said flight bars past said gate, a cam angularly adjustably carried by said carrier, and a lever having a cam follower engageable with said cam and connected to actuate said lever means to raise the gate prior to complete passage of a loaf of varying width thereover.

13. In a bread slicing machine, a plurality of band saw loops trained over supporting and driving rolls in spaced parallel relation with working reaches inclined from the vertical, upper and lower blade guide assemblies positioned in vertically spaced relation in front of the upper side of said working reaches and each including spaced parallel guide bars with slide rods therebetween, plural guide blocks corresponding to each working reach of said blades slidably supported and guided by said bars and rods of each assembly, said guide blocks having laterally offset conical portions engaging said rods and receiving the conical portions of an adjacent block, drive slots formed in the oppositely outer sides of the guide blocks in said assemblies and having drive pins extending thereacross transversely askew to said guide rods, inclined drive bars each having one end pivoted to said drive pins and extending in overlapped relation to adjacent drive bars, a pair of spacing levers pivotally supported on spaced pivots mounted adjacent the centers of said guide bars and extending in adjustable crossing relation in the planes of said guide bars and from the opposite upper and lower sides of said assemblies, blade guide fingers projecting in pairs laterally from said guide blocks in transversely and vertically spaced relation on opposite sides of said blades, adjusting screws mounted in spaced relation to said guide bars and having oppositely threaded ends with traveling nuts thereon, said inclined drive bars being pivotally connected to said traveling nuts, means connecting said adjusting screws to simultaneously and equally adjust the spacing between said guide blocks and said pairs of blade guide fingers, a feed conveyor having flight bars advanced down an incline transversely toward said blades between said guide assemblies, means guiding said flight bars downwardly closely adjacent said blades whereby the bars will push a loaf of bread incompletely through said blades, an intermediate horizontal conveyor having other flight bars arranged to deliver loaves to said feeding conveyor, a supply conveyor having one end delivering to said intermediate conveyor and slightly below the level thereof, gate means positioned between said last two conveyors to control the passage of loaves therebetween, said supply conveyor having a smooth surface permitting loaves to slide thereon, a continuously operative drive connected to drive said conveyors at progressively greater speeds with the flight bars on said feeding conveyor and intermediate conveyor in timed relation, an intermittent drive connection between said drive and said gate means arranged to lower said gate means in timed relation to said flight bars, and a loaf sensing means positioned adjacent said supply conveyor and connected to interrupt the drive connection to said gate means in response to an absence of loaves on said supply conveyor.

14. In a bread slicing machine, a plurality of band saw loops trained over supporting and driving rolls in spaced parallel relation with working reaches inclined from the vertical, upper and lower blade guide assemblies positioned in vertically spaced relation in front of the upper side of said working reaches and each including spaced parallel guide bars with slide rods therebetween, plural guide blocks corresponding to each working reach of said blades slidably supported and guided by said bars and rods of each assembly, said guide blocks having laterally offset conical portions engaging said rods and receiving the conical portions of an adjacent block, drive slots formed in the oppositely outer sides of the guide blocks in said assemblies and having drive pins extending thereacross transversely askew to said guide rods, inclined drive bars each having one end pivoted to said drive pins, a pair of spacing levers pivotally supported on spaced pivots mounted adjacent the centers of said guide bars and extending in adjustable crossing relation in the planes of said guide bars and from the opposite upper and lower sides of said assemblies, blade guide fingers projecting in pairs laterally from said guide blocks in transversely spaced relation on opposite sides of said blades, adjusting screws mounted in spaced relation to said guide bars and having oppositely threaded ends with traveling nuts thereon, said inclined drive bars being pivotally connected to said traveling nuts, means connecting said adjusting screws to simultaneously and equally adjust the spacing between said guide blocks and said pairs of blade guide fingers, a feed conveyor having flight bars advanced down an incline transversely toward said blades between said guide assemblies, means guiding said flight bars downwardly closely adjacent said blades whereby the bars will push a loaf of bread incompletely through said blades, an intermediate conveyor having other flight bars arranged to deliver loaves to said feeding conveyor, a supply conveyor having one end delivering to said intermediate conveyor, gate means positioned between said last two conveyors to control the passage of loaves therebetween, said supply conveyor having a smooth surface permitting loaves to slide thereon, a continuously operative drive connected to drive said conveyors at progressively greater speeds with the flight bars on said feeding conveyor and intermediate conveyor in timed relation, and an intermittent drive connection between said drive and said gate means arranged to lower said gate means in timed relation to said flight bars.

15. In a break slicing machine, a plurality of band saw loops trained over supporting and driving rolls in spaced parallel relation with working reaches inclined from the vertical, upper and lower blade guide assemblies positioned in vertically spaced relation in front of the upper side of said working reaches and each including spaced parallel guide bars with slide rods therebetween, plural guide blocks corresponding to each working reach of said blades slidably supported and guided by said bars and rods of each assembly, said guide blocks having conical portions laterally offset from the point of guiding engagement between the guide blocks and bars and engaging said rods and receiving the conical portions of an adjacent block, drive slots formed in the oppositely outer sides of the guide blocks in said assemblies and having drive pins extending thereacross transversely askew to said guide rods, inclined drive bars each having one end pivoted to said drive pins and extending in overlapped relation to adjacent drive bars, a pair of spacing levers pivotally supported on laterally spaced pivots mounted adjacent the centers of said guide bars and extending in adjustable crossing relation in the planes of said guide bars and from the opposite upper and lower sides of said assemblies,
the inclined drive bars on each side of said guide bars being connected to the spacing lever on the opposite side of the guide bar,
blade guide fingers projecting in pairs laterally from said guide blocks in transversely and vertically spaced relation on opposite sides of said blades,
adjusting screws mounted in spaced relation to said guide bars and having oppositely threaded ends with traveling nuts thereon,
said inclined drive bars being pivotally connected to said traveling nuts,
means connecting said adjusting screws to simultaneously and equally adjust the spacing between said guide blocks and said pairs of blade guide fingers,
a feed conveyor having flight bars advanced down an incline transversely toward said blades between said guide assemblies,
and means guiding said flight bars downwardly closely adjacent said blades whereby the bars will push a loaf of break incompletely through said blades.

16. In a bread slicing machine.
a plurality of band saw loops trained over supporting and driving rolls in spaced parallel relation with working reaches inclined from the vertical,
upper and lower blade guide assemblies positioned in vertically spaced relation and transversely across said working reaches and each including spaced parallel guide bars with slide rods therebetween,
plural guide blocks corresponding to each working reach of said blades slidably supported and guided by said bars and rods of each assembly,
drive slots formed in the oppositely outer sides of the guide blocks in said assemblies and having drive pins extending thereacross transversely askew to said guide rods,
inclined drive bars each having one end pivoted to said drive pins and extending in overlapped relation to adjacent drive bars,
a pair of spacing levers pivotally supported on laterally spaced pivots mounted adjacent the centers of said guide bars and extending in adjustable crossing relation in the planes of said guide bars and from the opposite upper and lower sides of said assemblies,
the inclined drive bars on each side of said guide bars being connected to the spacing lever on the opposite side of the guide bar,
blade guide fingers projecting in pairs laterally from said guide blocks in transversely spaced relation on opposite sides of said blades,
adjusting screws mounted in spaced relation to said guide bars and having oppositely threaded ends with traveling nuts thereon,
said inclined drive bars being pivotally connected to said traveling nuts,
means connecting said adjusting screws to simultaneously and equally adjust the spacing between said guide blocks and said pairs of blade guide fingers,
a feed conveyor having flight bars advanced down an incline transversely toward said blades between said guide assemblies,
and means guiding said flight bars downwardly closely adjacent blades whereby the bars will push a loaf of bread incompletely through said blades.

17. In a bread slicing machine,
a plurality of band saw loops trained over supporting and driving rolls in spaced parallel relation with working reaches inclined from the vertical,
upper and lower blade guide assemblies positioned in vertically spaced relation in front of the upper side of said working reaches and each including a guide bar and slide rod in spaced parallel relation,
plural guide blocks corresponding to each working reach of said blades slidably supported and guided by said bar and rod of each assembly,
said guide blocks having conical portions laterally offset from the point of guiding engagement between the guide blocks and bars and engaging said rods and receiving the conical portions of an adjacent block,
drive slots formed in the oppositely outer sides of the guide blocks in said assemblies and having drive pins extending thereacross transversely askew to said guide rods,
inclined drive bars each having one end pivoted to said drive pins,
a pair of spacing levers pivotally supported on laterally spaced pivots mounted adjacent the centers of said guide bars and extending in adjustable crossing relation in the planes of said guide bars and from the opposite upper and lower sides of said assemblies,
the inclined drive bars on each side of said guide bars being connected to the spacing lever on the opposite side of the guide bar,
blade guide fingers projecting in pairs laterally from said guide blocks in transversely spaced relation on opposite sides of said blades,
adjusting screws mounted in spaced relation to said guide bars and having oppositely threaded ends with traveling nuts thereon,
said inclined drive bars being pivotally connected to said traveling nuts,
and means connecting said adjusting screws to simultaneously and equally adjust the spacing between said guide blocks and said pairs of blade guide fingers.

18. In a bread slicing machine,
a plurality of band saw loops trained over supporting and driving rolls in spaced parallel relation with working reaches inclined from the vertical,
upper and lower blade guide assemblies positioned in vertically spaced relation in front of the upper side of said working reaches and each including a guide bar and slide rod in spaced parallel relation,
plural guide blocks corresponding to each working reach of said blades slidably supported and guide by said bar and rod of each assembly,
drive slots formed in the oppositely outer sides of the guide blocks in said assemblies and having drive pins extending thereacross transversely askew to said guide rods,
inclined drive bars each having one end pivoted to said drive pins,
a pair of spacing levers pivotally supported on laterally spaced pivots mounted adjacent the centers of said guide bars and extending in adjustable crossing relation in the planes of said guide bars and from the opposite upper and lower sides of said assemblies,
the inclined drive bars on each side of said guide bars being connected to the spacing lever on the opposite side of the guide bar,
blade guide means carried by said guide blocks,
adjusting screws mounted in spaced relation to said guide bars and having oppositely threaded ends with traveling nuts thereon,
said inclined drive bars being pivotally connected to said traveling nuts,
and means connecting said adjusting screws to simultaneously and equally adjust the spacing between said guide blocks and said pairs of blade guide fingers.

19. A blade guide for a multiple blade band saw having laterally adjustable blade guide holders comprising,
a support block having a projecting tongue attachable to one of said holders,
a post depending from the end of said block and having vertically off-set recessed seats formed on the opposite sides thereof parallel to the plane of said block,
and identical blade guide fingers seated and retained in said seats and projecting in vertically and laterally spaced relation to each other, said fingers having convex surfaces on one side opposed to each other.

20. A blade guide for a multiple blade band saw having laterally adjustable blade guide holders comprising, a support block having a projecting tongue attachable to one of said holders, vertically off-set recessed seats formed on the opposite sides of said block parallel to the plane of said tongue, and identical blade guide fingers seated and retained in said seats and projecting in vertically and laterally spaced relation to each other.

21. In a bread slicing machine, a plurality of band saw loops trained over supporting and driving rolls in spaced parallel relation with upright working reaches, upper and lower blade guide assemblies positioned in vertically spaced relation in back of said working reaches and each including a guide bar and slide rod in spaced parallel relation, plural guide blocks corresponding to each working reach of said blades slidably supported and guided by said bar and rod of each assembly, inclined drive bars each having one end pivoted to said guide blocks on the vertically opposite outer sides of said assemblies, a pair of spacing levers pivotally supported on laterally spaced pivots mounted adjacent the centers of said guide bars and extending in adjustable crossing relation in the planes of said guide bars and from the opposite upper and lower sides of said assemblies, the inclined drive bars on each side of said guide bars being connected to the spacing lever on the opposite side of the guide bar, blade guide means carried by said guide blocks, adjusting screws mounted in spaced relation to said guide bars and having oppositely threaded ends with traveling nuts thereon, said inclined drive bars being pivotally connected to said traveling nuts, and means connecting said adjusting screws to simultaneously and equally adjust the spacing between said guide blocks and said pairs of blade guide fingers.

22. In a bread slicing machine, a plurality of band saw loops trained over supporting and driving rolls in spaced parallel relation with upright working reaches, upper and lower blade guide assemblies positioned in vertically spaced relation in back of said working reaches and each including spaced parallel guide bars with slide rods therebetween, plural guide blocks corresponding to each working reach of said blades slidably supported and guided by said bars and rods of each assembly, a vertically adjustable support supporting the upper of said assemblies, said guide blocks having laterally offset conical portions engaging said rods and receiving the conical portions of an adjacent block, inclined drive bars each having one end pivoted to said vertically opposite upper and lower sides of the guide blocks in said assemblies, a pair of spacing levers pivotally supported on spaced pivots mounted adjacent the centers of said guide bars and extending in adjustable crossing relation in the planes of said guide bars and from the opposite upper and lower sides of said assemblies, blade guide fingers projecting in pairs laterally from said guide blocks in transversely spaced relation on opposite sides of said blades, adjusting screws mounted in spaced relation to said guide bars and having oppositely threaded ends with traveling nuts thereon, said inclined drive bars being pivotally connected to said traveling nuts, means connecting said adjusting screws to simultaneously and equally adjust the spacing between said guide blocks and said pairs of blade guide fingers, a feed conveyor having flight bars advanced transversely toward said blades between said guide assemblies, means guiding said flight bars downwardly closely adjacent said blades whereby the bars will push a loaf of bread incompletely through said blades, an intermediate conveyor having other flight bars arranged to deliver loaves to said feeding conveyor, a supply conveyor having one end delivering to said intermediate conveyor, gate means positioned between said last two conveyors to control the passage of loaves therebetween, said supply conveyor having a smooth surface permitting loaves to slide thereon, a continuously operative drive connected to drive said conveyors at progressively greater speeds with the flight bars on said feeding conveyor and intermediate conveyor in timed relation, and an intermittent drive connection between said drive and said gate means arranged to lower said gate means in timed relation to said flight bars.

23. A loaf delivery system for a bread slicing machine having a plurality of slicing blades arranged with generally parallel side by side working portions, said system comprising a pair of conveyors arranged in series with a first conveyor delivering to the second conveyor of the series, the second of said conveyors having pusher flights with loaf pockets therebetween, said pusher flights being guided in generally normal approaching direction to closely adjacent said working portions of said blades and then downwardly and vertically upwardly at the inlet end of said second conveyor, said first conveyor having other pusher flights tiltable thereon with loaf pockets therebetween and guided in upright loaf forwarding position to adjacent the adjacent ends of said conveyors and then guided away from loaf forwarding position along the return path of said second conveyor and along over a loaf width pocket length at the loaf receiving end of said first conveyor, a third conveyor arranged to deliver loaves to said first conveyor, drive connections connected to continuously drive said conveyors with said second conveyor driven at a faster rate of speed than said first conveyor and with the loaf pockets of the two conveyors in successive loaf transferring synchronization and with said first conveyor operating at a faster speed than said third conveyor, a blocking element positioned between said first and third conveyors and swingable away from said third conveyor into loaf releasing bridging relation between the conveyors, drive means connected to move said blocking element to loaf releasing position prior to arrival of each pusher flight on said first conveyor at the receiving end of said first conveyor, and control means actuated in response to an absence of bread adjacent said blocking element connected to interrupt the operation of said last drive means.

24. A loaf delivery system for a bread slicing machine having a plurality of slicing blades arranged with generally parallel side by side working portions, said system comprising a pair of conveyors arranged in series with a first conveyor delivering to the second conveyor of the series, the second of said conveyors having pusher flights with loaf pockets therebetween, said pusher flights being guided in generally normal approaching direction to closely adjacent said working portions of said blades and then generally parallel to said blades and back to generally normal to the inlet end of said second conveyor, said first conveyor having other pusher flights tiltable thereon with loaf pockets therebetween and guided in upright loaf forwarding position to adjacent the adjacent ends of said conveyors and then guided away from loaf forwarding position along the return path of said second conveyor and along over a loaf width pocket length at the loaf receiving end of said first conveyor, a third conveyor arranged to deliver loaves to said first conveyor, drive connections connected to continuously drive said conveyors with said second conveyor driven at a faster rate of speed than said first conveyor and with the loaf pockets of the two conveyors in successive loaf transferring synchronization and with said first conveyor operating at a faster speed than said third conveyor, a blocking element positioned between said first and third conveyors and swingable away from said third conveyor into loaf releasing bridging relation between the conveyors, drive means connected to move said blocking element to loaf releasing position prior to arrival of each pusher flight on said first conveyor at the receiving end of said first conveyor, and control means actuated in response to an absence of bread adjacent said blocking element connected to interrupt the operation of said last drive means.

References Cited by the Examiner
UNITED STATES PATENTS

| | | | |
|---|---|---|---|
| 2,131,256 | 9/38 | Petskeyes | 146—153 |
| 2,181,681 | 11/39 | Hoppe | 146—153 |
| 2,293,053 | 8/42 | Ferenci. | |
| 2,696,253 | 12/54 | Hartman. | |
| 2,739,696 | 3/56 | Heide | 198—34 |
| 2,759,510 | 8/56 | Hartman | 146—153 |
| 2,840,223 | 6/58 | Schoppee | 198—34 |
| 2,934,119 | 4/60 | Hoppe et al. | |
| 2,980,234 | 4/61 | De Koning | 198—34 |
| 3,111,214 | 11/63 | Heikinheimo | 198—34 |

J. SPENCER OVERHOLSER, *Primary Examiner.*